Patented Feb. 27, 1940

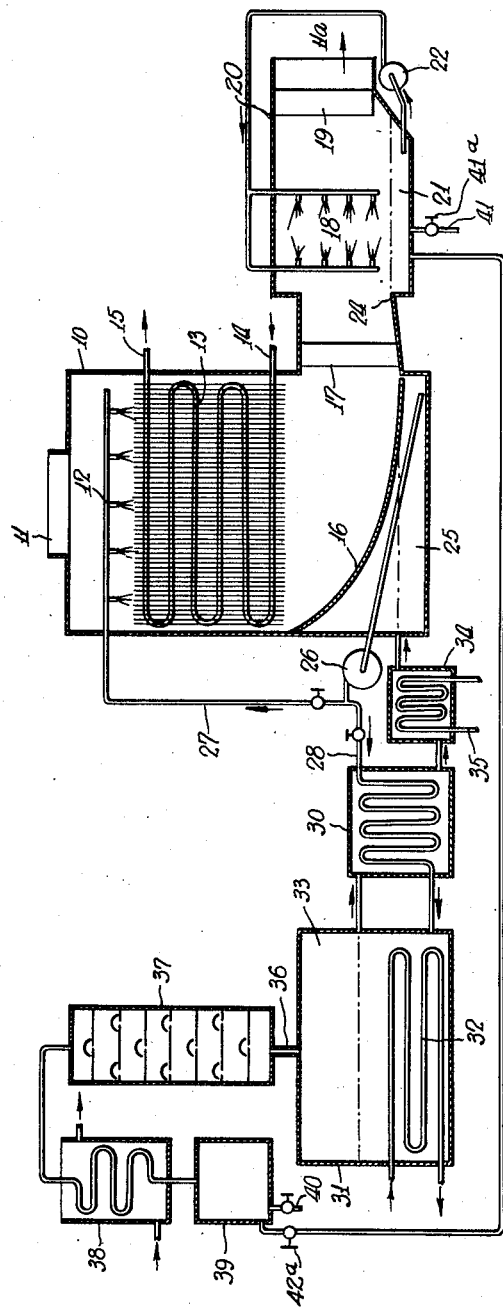

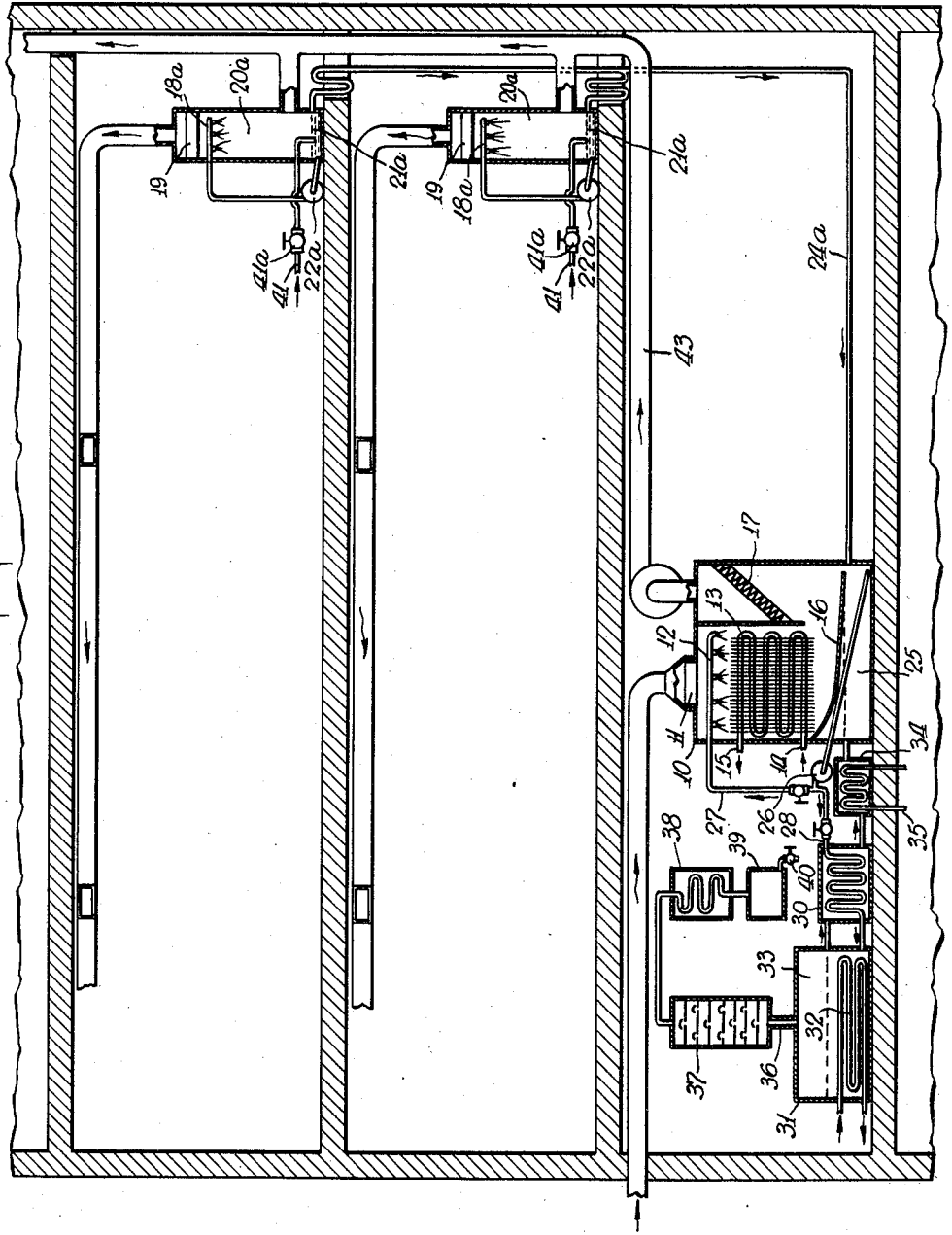

2,192,126

UNITED STATES PATENT OFFICE 2,192,126

METHOD OF CONDITIONING AIR

Charles R. Downs, Old Greenwich, Conn., assignor to The Calorider Corporation, Greenwich, Conn., a corporation of Connecticut Application August 4, 1938, Serial No. 223,043

15 Claims. (Cl. 62—176)

This invention relates to the conditioning of air for living rooms or other chambers. Certain organic compounds have recognized hygroscopic properties, but their use for the dehydrating of air has involved certain disadvantages or undesirable features, including the expense involved in the loss of the compound vaporized in the air stream and the contamination of the air stream by such vapors. Especially in air conditioning is it desirable to reduce to a minimum the quantity of organic compounds discharged into the air of an occupied space. The removal and recovery of the vapors by adsorption in a solid such as silica gel, charcoal or the like, involves additional expense for apparatus, and necessitates frequent and expensive revivification of the adsorbent.

In my improved process I remove such vapors by washing the partially dehydrated air produced in a first stage with a more dilute water solution of the hygroscopic compound in a second stage, which not only removes organic vapors from the air and recovers the compound, but by partial evaporation of the water, cools the air to a selected temperature in a moisture unsaturated condition.

By means of my invention the loss of the hygroscopic compound through partial vaporization is reduced to practically nothing, the air is not only dried but cooled without the use of mechanical refrigeration, and an accurate method of controlling both the moisture content of the air and the dry bulb temperature is provided by the selection of suitable hygroscopic compounds and by variation of the concentration of one or both of the solution strengths. The first solution may be reconcentrated by heating, and the moisture driven off together with any portions of the hygroscopic compound volatilized during the heating may be condensed and used in the dilute solution in the second stage.

Various volatile hygroscopic compounds may be employed, but I have found that organic polyhydric alcohols such as the glycols may be used to advantage, and of these the ethylene glycols and particularly triethylene glycol are preferred. The air may be dried by passing it in contact with water solutions of varying strengths to obtain varying moisture contents in the treated air. As triethylene glycol and other analogous compounds suitable for use in the present process are to a certain extent volatile, definite amounts of the vapors of the compound are carried out of the first step with the dehydrated air. The amount carried out, as well as the extent of the moisture absorption, will vary with the concentration as well as the temperature of the treating solution. The vapors so carried out being hygroscopic can be removed by the use of a substantially more dilute solution of the same compound in a second step.

In the accompanying drawings I have shown somewhat diagrammatically in Fig. 1 an arrangement of apparatus parts which may be employed for carrying out my improved method. Fig. 2 is another arrangement of parts which may be employed where the second units are separate from the first unit. Such apparatus is shown merely as an example of apparatus which may be employed, and it is to be understood that various other types of apparatus may be employed. In the construction illustrated the air is delivered through an absorption apparatus 10 comprising the first step, which is provided with an air inlet 11 at the top and a spray apparatus 12 adjacent to the inlet for delivering the concentrated solution in the same direction as the air flow. Due to the development of heat by the absorption of moisture from the air by the concentrated hygroscopic liquid, it is important to remove such heat. As shown, there is provided a fin tube radiator 13 with inlet and outlet connections 14 and 15 for a cooling liquid such as water from a cooling tower or a hydrant, or other suitable source of water at the desired temperature. The coils are provided with fins between which the air and liquid flow so as to expose thin films of the liquid to contact with the air, and to provide narrow passages whereby intimate contact of the liquid and the air is effected. Below the radiator there is provided a deflecting baffle 16 for collecting the liquid and directing the air current laterally through a spray eliminator 17 to a second chamber, comprising the second step, having a spray apparatus 18 to which a dilute solution of the hygroscopic liquid may be delivered. This sprayed liquid being of substantially less concentration than the liquid delivered to the spray 12, will remove the vapors of the hygroscopic compound, and due to the dried condition of the air, a portion of the water will evaporate to partially humidify the air to the desired extent and simultaneously cool it. The air is then delivered through a suitable spray eliminator 19 to the outlet 11a, from which the air may be returned to the rooms to be conditioned, and from which all or part of the air may be returned to the inlet 11 of the absorption apparatus 10. The extent of dehumidification effected in the apparatus 10 will depend upon various conditions, including the concentration of the solution and the temperature of the solution circulated around the cooling coil 13, assuming that sufficient time of contact is allowed for the solution and air to reach substantial equilibrium with each other. Obviously these conditions may be controlled in any suitable manner to obtain the extent of dehumidification and cooling desired. Likewise, the amount of humidification and cooling effected in the second chamber 20 will vary with the temperature of the liquid delivered to the sprays 18, the concentration of such liquid, and the intimacy of contact of the liquid and air. The more dilute the liquid delivered to the sprays 18, the more water will be evaporated, and the more effective will be the absorption of the vapors of the hygroscopic liquid.

The unevaporated liquid delivered by the sprays 18 may be collected in a sump 21 at the bottom of the chamber 20 and may be directly returned to the sprays by a pump 22. By suitable heat insulation the temperature of the recirculated solution will remain practically constant for any given set of conditions. If there be any excess liquid accumulating in the sump 21 due for example to accumulation of hygroscopic compound, it may overflow a weir 24 into a sump 25 at the bottom of the chamber 10. The weir may be adjustable in height to control the level in the sump 21, and the deflector 16 is spaced from the wall of the sump, or is perforated to permit the liquid from the spray 12 to collect in the sump 25. Preferably the wall from the weir 24 to the sump 25 is downwardly inclined to facilitate drainage into the sump of any liquid removed by the spray eliminator 17.

The liquid flowing over the weir 24 will carry back to the sump 25 the hygroscopic material absorbed from the air, and will thus continuously prevent the accumulation of the hygroscopic compound in the liquid circulating through the sump 21 and the sprays 18.

In order to maintain the hygroscopic liquid in the first step at the desired concentration, there is provided a concentrating still 31 having a heating element 32 and a free space 33 at the upper portion. The liquid collecting in the sump 25 may be withdrawn by a pump 26 and a portion may be delivered through a valve controlled conduit 27 to the sprays 12, and a portion delivered through a valve controlled conduit 28 through a heat interchanger 30 to the bottom of the still. Liquid withdrawn near the liquid level in the still may be returned through the heat interchanger 30 and through a cooler 34 having a cooling coil 35. Thus, by regulating the valves in the conduits 27 and 28 and returning any desired portion for reconcentration, and returning the remainder directly to the sprays 12, the concentration of the liquid delivered to the sprays 12 may be maintained substantially constant, or may be set at any value desired.

The vapors delivered from the still 31 may escape through an outlet 36 to a column or separator 37 in which most of the vapors of the hygroscopic compound will be condensed and returned through the passage 36. The water vapors together with any such portion of the vapors of the hygroscopic liquid which are not condensed may flow from the top of the column 37 to a condenser 38, and the condensed liquid flow to a collecting chamber 39. From this chamber a portion of the condensed liquid may be returned to the sump 21 so that the liquid delivered to the sprays 18 will contain such portion of the hygroscopic compound as escapes from the column 37, and will also contain such portion of the hygroscopic compound as was vaporized in the absorption apparatus 10 and absorbed in the spraying apparatus 18. The water delivered from the chamber 39 can be used to make up for the water evaporated in the sprays 18, and the only loss of hygroscopic compound will be that small portion contained in the excess water collected in the chamber 39, and which it is not necessary to return to the sump 21, and the small amount of hygroscopic compound vapor which is not washed out by the sprays 18. Any excess liquid from the chamber 39 may be withdrawn from the system through an outlet 40. It is to be understood that the amount of hygroscopic compound in the chamber 39 may be negligible if an efficient fractionating column 37 is used. The use of the system described, however, permits using a simple separator 37, thereby greatly decreasing installation costs. All of the operations may be controlled in various ways, for instance, by thermostats, humidostats, and specific gravity equipment, but such control forms no portion of the present invention and is unnecessary if the operation be manually controlled in accordance with changing conditions of temperature, concentration, etc. The circulation of the air is preferably a forced circulation and may be effected by a suitable fan at the inlet 11, the outlet 11a, or at any point in the circulating path of the air to be treated.

If the amount of the hygroscopic compound escaping from the column 37 be negligible, the condenser 38 and the collecting chamber 39 may be omitted, and the supply of water required to replace the water evaporated in the sprays 18 may be delivered to the system as may be required, for instance, directly to the sump 21 through the pipe 41. The use of the water condensed in the condenser 38 and returned through pipe 42 controlled by valve 42a instead of using an outside source of makeup water is desirable, because it prevents the accumulation in the system of such salts as might be in solution in the ordinary outside water supply, and thus prevents contamination of the hygroscopic solutions and corrosion or incrusting of the various parts of the apparatus, and particularly the still.

Control of the temperature and humidity of the air delivered from chamber 10 is by means of the valve 41a in dilution conduit 41 or valve 42a in conduit 42.

As the process proceeds, more and more of the hygroscopic constituent is absorbed from the treated air from dehumidifier 10 in the sprays 18, causing the solution to sprays 18 to become progressively more concentrated. Evaporation of water from this body of circulating solution at the sprays 18 further acts to concentrate the active hygroscopic material. Finally, the concentration of hygroscopic material in the solution to the sprays 18 becomes so high that rehumidification and cooling of the air by vaporization of the water is lessened and the required temperature and humidity at outlet 11a are not obtained. When that point is reached, valve 41a in pipe 41 is opened and the solution to sprays 18 is rediluted, simultaneously causing some of the hygroscopic material to flow back to the main sump 25 over the weir 24.

The pipe 42 may be used to furnish, for dilution purposes, distilled water condensed in condenser 38 of the still 31, in place of other water when the latter contains contaminations. Control of dilution may be accomplished by the manipulation of the valve 42a in place of valve 41a. When not required for dilution purposes, the distilled water is discarded through valve 40.

As previously noted, the concentrations may be varied in accordance with the operating conditions and the results required. If triethylene glycol be employed, the solution delivered to the sprays 12 may be about 95% and if the cooling liquid circulated through the tubes of the fin tube radiator 13 is suitable as to temperature and volume so as to discharge the air to the sprays 18 at 80° F. dry bulb, this air will be at approximately 20° F. dewpoint and 53° F. wet bulb. The triethylene glycol solution recirculated through the sprays 18 from the sump 21 may be a 60% solution which will insure the absorption of most of the triethylene glycol vapors delivered with the air from the fin tube radiator and the evaporation of some water to lower the temperature of the air delivered through the outlet 11a.

By using a 95% triethylene glycol solution in the first step and a 60% triethylene glycol solution in the second step, I may discharge air from outlet 11a containing less than one tenth as much triethylene glycol as would be the case if the air was discharged directly from contact with the 95% triethylene glycol solution in the first step. For example, in an apparatus treating 18,000 cubic feet of air per minute, the loss of triethylene glycol by the single step process would be about one third of a pound per hour, and by my two step process, this may be reduced to less than three hundredths of a pound per hour, thereby providing not only a saving of hygroscopic compound but also preventing the vapors thereof from entering the occupied space. Furthermore, the discharged air possesses the desirable quality of not being saturated with moisture at its discharge temperature.

If I increase the concentration of the solution in the first step, the rate of vaporization of the hygroscopic compound is increased, but the moisture content of the air is reduced. The temperature of the solution in the second step will thereby be reduced by the evaporation of water at a greater rate and the amount of hygroscopic compound left in the air will be reduced and the discharged air will be colder. Or I may vary the concentration of the solution in the second step and thereby vary the moisture content, the hygroscopic compound content and the temperature of the discharged air. By balancing the concentrations of the solutions in the two steps, I may control the loss of hygroscopic compound, the moisture content of the air, and its temperature. Other concentrations would be employed for other conditions of operation and for other types of volatile hygroscopic compounds. Therefore, by the terms "concentrated" and "dilute" I mean such percentage compositions of the solutions as will operate satisfactorily to obtain the results desired.

Although I have shown in Figure 1 an arrangement of apparatus suitable for carrying out my invention, I do not intend to be limited thereby. For example, I have shown in Fig. 2 a single unit 10 for drying the air in the first step by contacting it with a liquefied volatile hygroscopic compound and distributing the dried air at a relatively high temperature through ducts 43 to one or more units 20a relatively remote, near or at the place to be conditioned, for performing the second step of cooling the air and absorbing and recovering the volatilized hygroscopic compound. By such an arrangement I may transport the air through ducts, that need not be thermally insulated to prevent the ingress of heat into the air, which would take place if the air were treated in a second step situated adjacent the first step and then transported as cooled air to the point of use. In this way, I may regulate the temperature of the air and its content of hygroscopic compound vapor and moisture discharged to a remote space, by using in the second step a suitable strength of a water solution of the volatile hygroscopic compound. Furthermore, when there are several separate spaces to be conditioned, I may treat the air delivered to the second step in as many units 20a as there are spaces to be conditioned, and regulate the quality of the air discharged from each second step unit by water solutions of the volatile hygroscopic compound whose strengths are best suited for providing suitable conditioning in each space. The solutions used in washing the hygroscopic compound from the air in the second step may be returned by suitable piping 24a, and traps or pumps, if necessary, to the concentrator, or still, used for removing water therefrom and recovering the hygroscopic compound in concentrated form, or separate concentrators may be used to recover the concentrated hygroscopic compound for reuse. The water recovered by the separate concentrators from the more dilute solutions may be used for maintaining a suitable strength of the more dilute solutions as water is evaporated therefrom in the second step units, or make-up water may be supplied through pipes 41 and controlled by valves 41a as above described. The valves 41a and 42a may be manually operated in accordance with the readings of humidostats or thermostats exposed to the treated air, or may be directly controlled by such humidostats or thermostats.

It is to be understood that both the first and second steps may be carried out at pressures other than atmospheric, and it is realized that certain advantages may be attained by this means. For example, in existing buildings in which it is difficult and expensive to install ducts of large cross-sectional dimensions, the air may be treated at superatmospheric pressures and conveyed through small diameter pipes to the conditioned spaces. Such air may have been treated by the first and second steps before discharging it under pressure into the piping system, or it may be dehumidified in the first step at superatmospheric pressures and permitted to expand before or during treatment in the second step, in which event I obtain some beneficial cooling of the air due to the expansion. The energy released by the expansion of the air at the second step may, if desired, be put to useful work such as in an air motor for driving the pump used for supplying the more dilute solution to the sprays of the second step. Since the air contains very little moisture its expansion will not cause freezing of the expansion valve or the air motor.

Piping systems suitable for my process are available with but slight alterations in existing buildings that are heated in winter by steam, or hot water radiators. In that event the dried air may be discharged into the supply steam or hot water lines and conveyed to the standing radiation devices in the rooms, or into expansion chambers especially provided for the purpose. The air expanded into these radiators or other such devices may be treated therein with the more dilute hygroscopic solution and then discharged therefrom into the room to be conditioned, and the return lines to the heating boiler may be used to convey the excess of the more dilute hygroscopic solution back to the boiler which may be used for reconcentrating the same and the evaporated water may be recovered, if desired.

It is to be understood, that if such a piping system is not used for distributing treated air to the conditioned space, the existing boiler employed for winter heating may be used instead of a special still for concentrating the dilute solution, as well as for maintaining the concentration of the more concentrated hygroscopic compound used in the first step of the process.

By using the piping system already available for steam or hot water heating of the building, as a means for conveying conditioned air to the various parts of the building, I may perform both the first and the second steps under pressure, and convey the cooled and dehumidified air to the spaces to be conditioned with negligible gain in temperature of the cool air in the pipes, since they are regularly provided with thermal insulation for winter use.

From the above it is clear that the method can be applied to the conditioning of air in buildings in a variety of ways, and the one most suitable for the purpose may be selected.

Having thus described my invention, what I claim as new and desire to secure by Letters Patent is:

1. The method of conditioning air to a moisture unsaturated state, which includes absorbing moisture from a current of air by the action of a concentrated solution of a volatile hygroscopic compound, washing out of the dehydrated air vapors of said compound carried by said dehydrated air and cooling said dehydrated air by contact with a more dilute solution of said compound, and preventing accumulation of said compound in said dilute solution by withdrawing a portion thereof.

2. The method of conditioning air, which includes the steps of bringing the air into intimate contact with a cooled, relatively concentrated aqueous solution of a volatile hygroscopic compound, then bringing the air into intimate contact with a more dilute aqueous solution of said hygroscopic compound to remove vapors of said compound discharged from the first step, and to cool the air by evaporation of water from the dilute solution, and returning to the concentrated solution the compound withdrawn from the air in the second stage.

3. The method of conditioning air, which includes the steps of bringing the air into intimate contact with a relatively concentrated aqueous solution of a volatile hygroscopic liquid, and simultaneously cooling the air and solution to remove latent heat of moisture absorption, then bringing the air into intimate contact with a more dilute aqueous solution of said hygroscopic liquid to remove vapors of said liquid discharged from the first step, and to cool the air by evaporation of water from the dilute solution, and maintaining the concentration of said dilute solution substantially constant.

4. The method of cooling air, which includes bringing the air into intimate contact with a relatively concentrated aqueous solution of a volatile hygroscopic compound, simultaneously cooling the air to remove latent heat of moisture absorption, bringing the air into intimate contact with a relatively dilute solution of said compound to absorb vapors of said hygroscopic compound and to cool and humidify the air by partial evaporation, adding water to said dilute solution to make up losses due to the humidification, and withdrawing a portion of said dilute solution to prevent progressive increased concentration of said compound therein.

5. The method of conditioning air, which includes bringing the air into intimate contact with a relatively concentrated solution of a glycol, cooling the air to remove the latent heat of moisture absorption, then washing from the air the glycol vapors volatilized in the first step, by the use of a more dilute glycol solution, and returning to the concentrated solution the glycol absorbed by the dilute solution.

6. The method of conditioning air, which includes bringing the air into intimate contact with a relatively concentrated solution of an ethylene glycol, cooling the air to remove the latent heat of moisture absorption, then washing from the air the ethylene glycol vapors discharged in the first step, by the use of a more dilute ethylene glycol solution, and maintaining the relative concentrations of said solutions by returning portions of the dilute solution to the concentrated solution.

7. The method of conditioning air, which includes bringing the air into intimate contact with a relatively concentrated solution of triethylene glycol, cooling the air, then bringing the air into contact with a more dilute triethylene glycol solution to wash from the air triethylene glycol vapors volatilized in the first step, and returning to the relatively concentrated solution the triethylene glycol carried into the more dilute solution by the air.

8. The method of conditioning air, which includes bringing the air into intimate contact with a relatively concentrated aqueous solution of a volatile hygroscopic agent, simultaneously cooling the air and solution to remove the latent heat of moisture absorption, heating the solution to drive off absorbed water, cooling the solution and returning it for contact with further air, condensing the water and vapor driven off by said heating, mixing said condensate with a relatively dilute solution of said hygroscopic agent, bringing the air into intimate contact with said mixture to absorb the vapors of said agent carried from the first step by said air, and returning the absorbed vapor to said relatively concentrated solution.

9. The method of conditioning air, which includes subjecting the air to intimate contact with a solution of a volatile hygroscopic liquid, removing latent heat of moisture absorption, reconcentrating said solution by heating to drive off the absorbed moisture, condensing the moisture, mixing said condensate with a more dilute solution of said hygroscopic liquid, spraying said mixture into the air to cool the air and remove from the latter vapors of said liquid carried by the air from the first step, and maintaining the concentration of said mixture substantially constant.

10. The method which includes absorbing moisture from a current of air by the action of a concentrated solution of a volatile hygroscopic liquid, recovering the absorbed water from said solution; spraying a portion of it into said air to cool the air by evaporation of water to remove from the air, vapors absorbed by the air from said concentrated solution, and returning a portion of the water containing the absorbed vapors to said concentrated solution.

11. The method which includes absorbing moisture from a current of air by the action of a concentrated solution of triethylene glycol, spraying a dilute solution of triethylene glycol into said air to cool the air and to remove from the latter triethylene glycol vapors absorbed by the air from said concentrated solution, and returning a portion of the dilute solution to the concentrated solution to prevent undue accumulation of triethylene glycol in the dilute solution.

12. The method which includes circulating an aqueous, relatively concentrated solution of a volatile hygroscopic liquid in a closed cycle, including a moisture absorbing stage in contact with air, a heating and concentrating stage to remove absorbed moisture, and a cooling stage, circulating a relatively dilute solution of said hygroscopic liquid in a second closed cycle including an air moistening and cooling stage in contact with said air to remove the vapors of said liquid from the air, and returning to said first cycle hygroscopic liquid absorbed by said dilute solution.

13. The method of conditioning air in a room, which includes absorbing moisture from a current of air at a point remote from said room, by the action of a concentrated solution of a volatile hygroscopic agent, conveying the dehydrated air to a point near said room and in contact with a more dilute solution of said agent at said latter point, to remove vapors of said agent carried by said dehydrated air, and to cool said latter air, discharging the treated air into said room, and maintaining the concentration of said more dilute solution substantially constant.

14. The method of conditioning air in a plurality of rooms, which includes absorbing moisture from a current of air at a station remote from said rooms, by the action of a concentrated solution of a volatile hygroscopic agent to form a supply of dehydrated air, conveying said dehydrated air in separate streams to points near said rooms respectively, bringing said streams of dehydrated air respectively in contact with more dilute solutions of said agent at said latter points to remove vapors of said agent carried by said streams, and to cool said streams, maintaining the concentration of said more dilute solution substantially constant, and discharging the treated streams into their associated rooms, respectively.

15. The method of conditioning air in a plurality of rooms, which includes absorbing moisture from a current of air at a station remote from said rooms, by the action of a concentrated solution of a volatile hygroscopic agent, to form a supply of dehydrated air, conveying said dehydrated air in separate streams to points near said rooms respectively, bringing said streams of dehydrated air respectively in contact with more dilute solutions of said agent at said latter points, to remove vapors of said agent carried by said streams and to cool said streams, controlling the extent of dilution of each of said dilute solutions of said agent in accordance with the desired condition of the air to be maintained in its associated room, and discharging the treated streams into their associated rooms respectively.

CHARLES R. DOWNS.